United States Patent
Pedlow, Jr.

(10) Patent No.: US 8,050,406 B2
(45) Date of Patent: Nov. 1, 2011

(54) KEY TABLE AND AUTHORIZATION TABLE MANAGEMENT

(75) Inventor: Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1124 days.

(21) Appl. No.: 11/348,777

(22) Filed: Feb. 7, 2006

(65) Prior Publication Data

US 2006/0274898 A1  Dec. 7, 2006

Related U.S. Application Data

(60) Provisional application No. 60/688,553, filed on Jun. 7, 2005.

(51) Int. Cl.
*H04L 9/00* (2006.01)

(52) U.S. Cl. ........ 380/277; 713/182; 713/189; 713/192; 380/200; 380/203; 380/210; 380/278

(58) Field of Classification Search .................. 713/182, 713/189, 192; 380/200–203, 210, 277–278
See application file for complete search history.

(56) References Cited

U.S. PATENT DOCUMENTS

| | | | |
|---|---|---|---|
| 4,809,327 A | | 2/1989 | Shima |
| 5,020,129 A | * | 5/1991 | Martin et al. ................... 725/27 |
| 5,237,611 A | | 8/1993 | Rasmussen et al. |
| 5,915,025 A | | 6/1999 | Taguchi et al. |
| 6,351,813 B1 | | 2/2002 | Mooney et al. |
| 6,359,986 B1 | | 3/2002 | Tatebayashi |
| 6,601,237 B1 | * | 7/2003 | Ten Kate et al. ................ 725/47 |
| 6,697,489 B1 | * | 2/2004 | Candelore ...................... 380/200 |
| 2001/0030959 A1 | * | 10/2001 | Ozawa et al. .................. 370/386 |
| 2002/0001386 A1 | * | 1/2002 | Akiyama ....................... 380/201 |
| 2002/0076204 A1 | | 6/2002 | Nakano et al. |
| 2002/0101995 A1 | * | 8/2002 | Hashimoto et al. ........... 380/277 |
| 2003/0026431 A1 | | 2/2003 | Hammersmith |
| 2004/0105549 A1 | * | 6/2004 | Suzuki et al. .................. 380/278 |
| 2004/0158721 A1 | * | 8/2004 | Candelore ...................... 713/182 |
| 2004/0162980 A1 | | 8/2004 | Lesenne et al. |

(Continued)

OTHER PUBLICATIONS 802.11i (How we got here and where are we headed) Sans Institute by Elio Perez Aug. 21, 2004.*
International Search Report and Written Opinion of the International Searching Authority, PCT/US06/17016, Feb. 28, 2008 (Received Mar. 13, 2008).

*Primary Examiner* — Vivek Srivastava
*Assistant Examiner* — Michael D Anderson
(74) *Attorney, Agent, or Firm* — Miller Patent Services; Jerry A. Miller

(57) ABSTRACT

A receiver device consistent with certain embodiments that receives and decrypts digital cable or satellite television signals has a receiver that tunes and demodulates the television signal into a digital transport stream. A decrypter decrypts the digital transport stream using a pair of decryption keys. A first decryption key array stored in a first storage location forming a part of the receiver device, and a second key array stored in a second storage location forming a part of the receiver device, the first and second key arrays representing ordered pairs of keys. An authorization table is stored in a third storage location forming a part of the receiver device, the authorization table containing a mapping, wherein each ordered pair of decryption keys corresponds to a different one of a plurality of Multichannel Video Program Distributors (MVPD). This abstract is not to be considered limiting, since other embodiments may deviate from the features described in this abstract.

39 Claims, 5 Drawing Sheets

U.S. PATENT DOCUMENTS

2004/0181800 A1* 9/2004 Rakib et al. .................... 725/25
2006/0031873 A1* 2/2006 Fahrny et al. ................. 380/200

* cited by examiner

KEY TABLE AND AUTHORIZATION TABLE MANAGEMENT

CROSS REFERENCE TO RELATED DOCUMENTS

This application is related to U.S. provisional application No. 60/688,553 file Jun. 7, 2005, which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

In digital cable television systems, encryption is commonly used for blocking channels that have not been paid for. Those channels can generally only be accessed once an appropriate decryption key is available to the customer premise equipment (CPE; e.g., a television set-top box (STB), or properly enabled digital television set). Decryption keys are most commonly conveyed to the CPE using entitlement control messages (ECMs) that are transmitted from the network operator or an equivalent authority to the CPE. The content which is to be protected is most commonly encrypted using known algorithms such as the advanced encryption standard (AES), the DVB Common Scrambling Algorithm, the data encryption standard (DES) or its variants. Since these encryption/decryption algorithms themselves are publicly available, the key to the security of the content lies in the ability to conceal the decryption keys necessary to decrypt the content. In most subscription or pay-TV systems, the key-carrying ECMs are transmitted concurrently with the content in a single, common data transport stream.

For this reason, decryption keys transmitted via the ECM are commonly encrypted using proprietary encryption techniques. The encrypted keys are then commonly transmitted to the CPE via the ECM on an inband channel, changing on a very frequent basis in order to thwart a hacker's ability to decrypt the content based on an exhaustive trial and error key search. Unfortunately, one of the very tools used to thwart the hacker (frequent variation of the key and transmission of ECMs containing encrypted keys) provides a clue to the hacker to help crack the encryption algorithm. Each time a key is transmitted, more data is available to the hacker that can potentially be used to crack the encryption algorithm itself. Should the algorithm be cracked, the content is then unprotected, requiring costly revisions to the encryption algorithm and re-provisioning or even physical replacement of the CPE.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
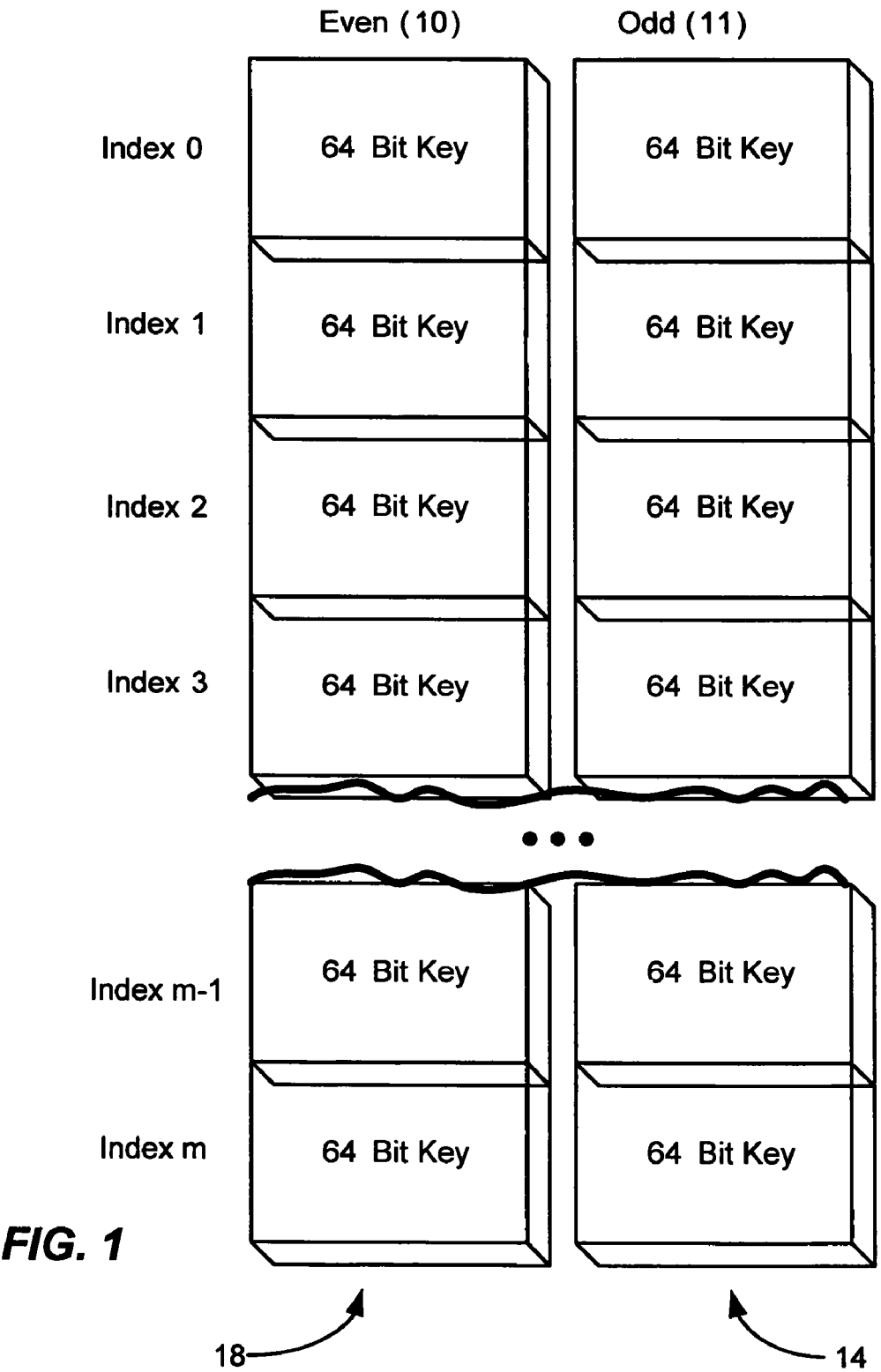
FIG. 1 is an exemplary key table consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content which would be interpreted as and reported in an electronic program guide (EPG) as a single television program, without regard for whether the content is a movie, sporting event, segment of a multi-part series, news broadcast, etc. The terms "scramble" and "encrypt" and variations thereof are used synonymously herein.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive. The following Acronyms and Abbreviations may be used herein:

| | |
|---|---|
| BAC | Basic Access Control |
| BAT | Bouquet Association Table |
| CA | Conditional Access |
| CAS | Conditional Access System |
| CASID | Conditional Access System Identifier |
| CMTS | Cable Modem Termination System |
| CPE | Customer Premises Equipment |
| DOCSIS | Data Over Cable System Interface Specification |
| DVB | Digital Video Broadcast |
| ECM | Entitlement Control Message |
| EMM | Entitlement Management Message |
| IC | Integrated Circuit |
| MPEG | Moving Pictures Experts Group |
| MVPD | Multichannel Video Program Distributor |
| MSO | Multiple System Operator |
| NIT | Network Information Table |
| NTS | Network ID, Transport ID and Service ID |
| NTSC | National Television Standards Committee |
| OSD | On-Screen Display |
| PAT | Program Allocation Table |
| PID | Packet Identifier |
| PMT | Program Map Table |
| PPV | Pay-per-View |
| PSI | Program Specific Information |
| QAM | Quadrature Amplitude Modulation |
| SI | Service Information |

In order to reduce the exposure of keys in a cable or satellite television system, and in order to significantly simplify the complexity of the management system at both the transmission point and in the customer premises equipment, a content key management system is provided in accordance with certain embodiments consistent with the present invention.

A content key management structure consistent with certain embodiments for a basic access control subsystem is for use in a digital cable or satellite television system, which augments or preferably, replaces the analog services on the existing plant with the digital equivalent of each analog service.

In traditional CA systems, key epochs are commonly on the order of milliseconds, seconds or minutes. The basic access control system provides for dynamic replacement of the content keys used to encrypt/decrypt, with a key epoch that may be significantly longer (on the order of days, weeks or months—if ever) than that used in a traditional CA system, but without the complexity, costs and additional messaging systems associated with those systems. Key delivery and CPE authorization is performed through the delivery of an entitlement management message (EMM), delivered through both (or either) DOCSIS (out of band delivery), for two-way devices, and in-band for supporting one-way devices.

In one embodiment the basic access control schema employed uses at least one key pair per service tier. Service tiers are groups of individual logical channels associated with services that are bundled as a discrete entity ("a package"). This methodology is extensible to support service tiers of any size, including single programs, such as individual events. Access to a particular service tier is determined by whether a supported CPE device has possession of the appropriate service tier key(s). To maintain message security, all EMMs are signed by the network operator's private key so that the received message may be authenticated by the CPE device.

FIG. 1 depicts a set of keys for encrypted content that are stored in the CPE (e.g., a television set-top box) in nonvolatile memory in a secure manner (e.g., using hardware protection against accessing memory containing the keys). U.S. Patent publication number US2002/0196939 to Unger, et al. describes an exemplary television set-top box hardware and software that carries out multiple selective decryption. This is an example of a CPE device that can be suitably modified to carry out processes consistent with certain embodiments of the present invention. This publication is hereby incorporated by reference.

The content keys are stored in secure persistent memory and organized as an array or table 12 that constitutes a key library. This library can be accessed by hardware such as a programmed processor within the CPE as needed. One arrangement for such a key library is shown in FIG. 1. The keys in this example are arranged in m+1 pairs, for use in the decryption process, with members of the pair being referred to as either odd keys 14 or even keys 18. In one example, which should not be considered limiting, the keys are 64 bits in length, but 128 bits or any other suitable key length can be used. Each of the m+1 pairs of keys are indexed with an address reference (which could be a memory address, an actual key number, a name, a key identifier or a memory offset, for example).

An exemplary structure for the array is as follows:

```
UINT16      key_index;
BOOLEAN     key_phase;
UINT64      content_key[key_index, 2];
if (transport_scrambling_control == '10')
    key_phase = 0;
else
    if ((transport_scrambling_control == '11')
        key_phase = 1;
```

The maximum possible storage requirement for this example key structure if it contains every possible 64 bit key is 1 MByte. It is unlikely that a system would currently have need for 65,536 unique keys (32,768 unique key pairs), but in the future, it is possible that even more key pairs and keys of greater length may be used. It is, however, anticipated that for cable and satellite applications, at least 16,777,216 unique keys (8,388,608 unique key pairs) is preferred at a minimum. Also, multiple logical channels may be mapped to the same actual key value without departing from embodiments consistent with this invention. The same content key can be used for both audio and video elements of a particular service, but other variations are also possible.

Figure 2:
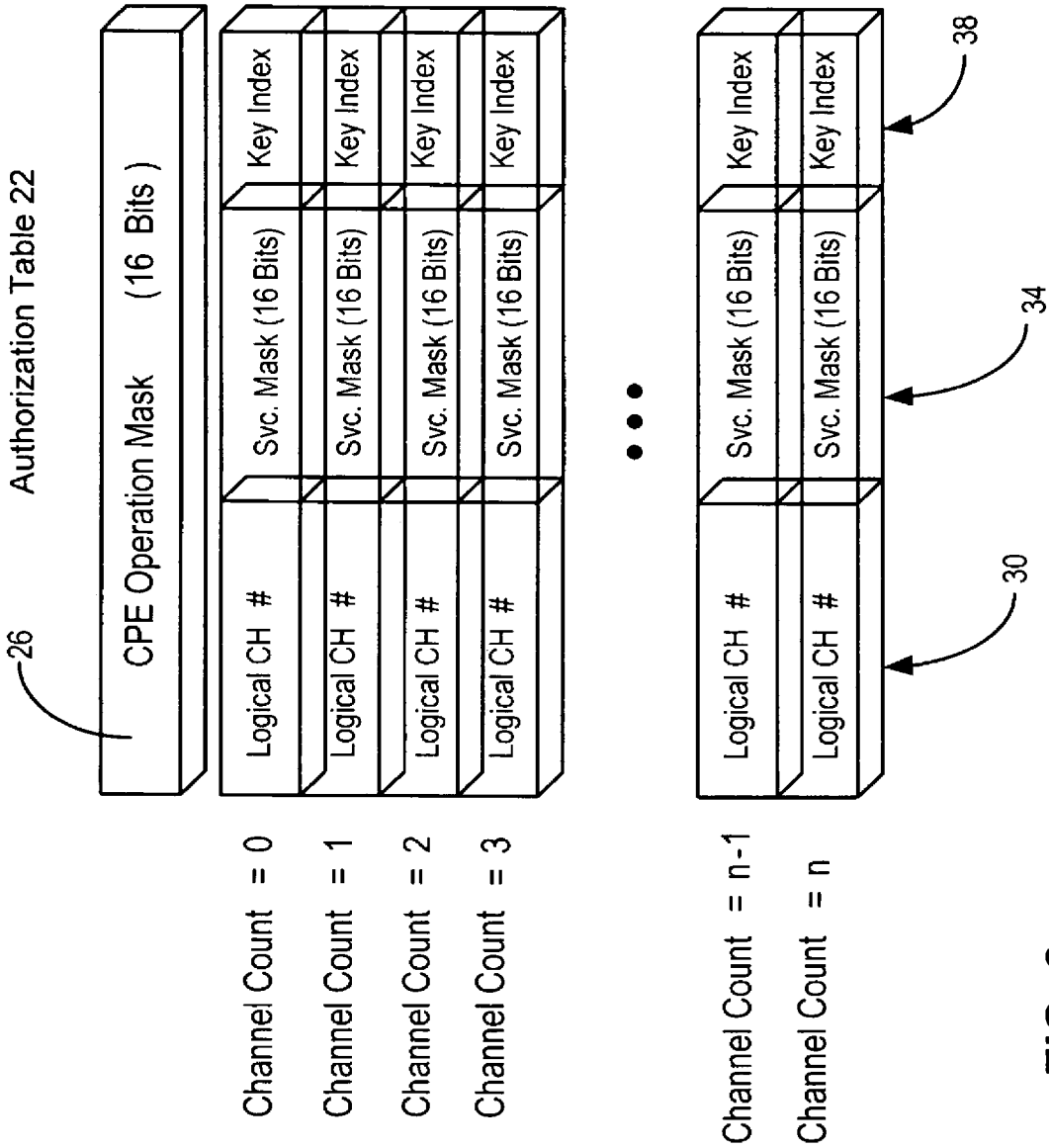
FIG. 2 is an exemplary authorization table consistent with certain embodiments of the present invention.
Figure 3:
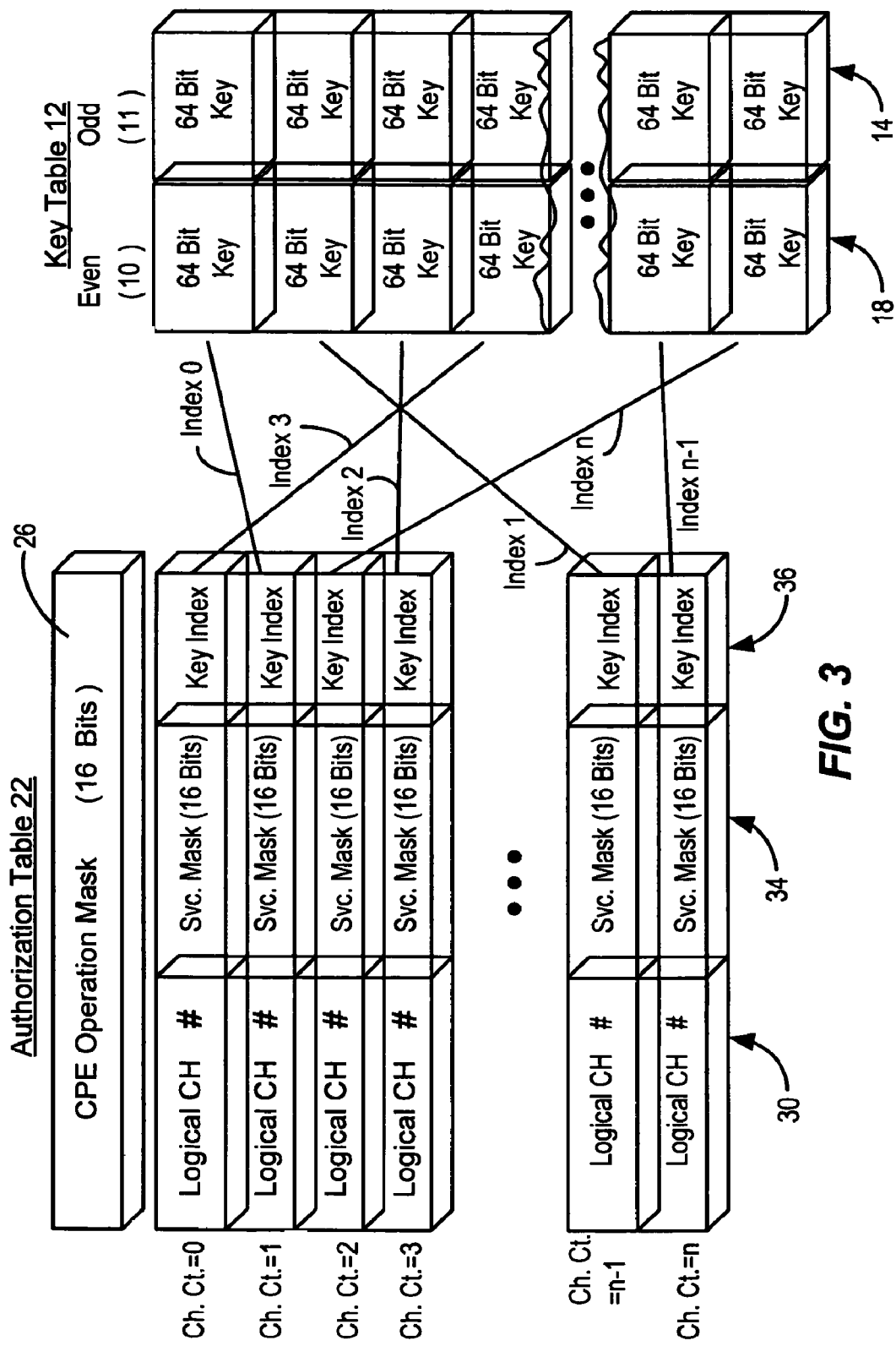
FIG. 3 illustrates the relationship between the exemplary key table and the exemplary authorization table in a manner consistent with certain embodiments of the present invention.

The association of a particular key pair (even & odd phase) to a specific service is done through data contained in the table delivered through the program authorization descriptor, mapping a logical channel to a key_index value, which is then used to find the corresponding content key pair in the content key table 12. This information is contained in an Authorization Table 22 as depicted in FIG. 2. Other embodiments may contain multiple instances of key and authorization tables, each pair of which corresponds to different networks, such as different MVPDs (e.g. different cable providers, satellite providers and telephone system operators) provided speculatively for networks that the client device may at some point be attached to. The authorization table 22 also contains a CPE Operation Mask 26 which determines global features that a particular CPE is to have enabled or disabled while operating on the network (e.g., reset, etc.). For each logical channel 0–n at 30, there is a service mask 34, which determines which channels a particular user is authorized to access as well as operational attributes (such as activation of anti-taping controls, etc.) to be associated with a particular service, and a key index 38 that associates each channel with a key pair which is designated for use in decrypting the channel. The authorization table 22 containing the list of logical channels and the associated key indices is also securely stored, as with the key table 12, in nonvolatile memory within the CPE.

The relationship between the key table 12 and the authorization table 22 is illustrated in FIG. 2. In this example, logical channels are currently mapped to the key table entries in accordance with the following TABLE 1:

TABLE 1

| Logical Channel | Key index |
|---|---|
| 0 | 3 |
| 1 | 0 |
| 2 | m |
| 3 | 2 |
| ... | ... |
| n-1 | m-1 |
| N | m |

By mapping a pair of keys stored in the key table 12 to an index to the keys by channel in authorization table 22, the key for a particular channel or program can be changed by simply sending an index to the CPE associated with the channel. In this manner, the working key for a particular service or group of services can be changed without any risk that it be exposed through transmission of the key itself by merely sending a new array of key indices via EMM.

Content key delivery can be performed through use of an EMM containing a valid key data descriptor. Content key data is organized as shown in FIG. 1 as a key table 12 containing the pair of content key values covering both MPEG encryption phases (even and odd). In non-MPEG embodiments, pairs of keys may also be advantageous, but should not be considered limiting. These content key pairs are associated with an index identifying a particular content key pair. The key data descriptor structure allows for the en masse replacement of an entire column (even or odd) of content keys in the table associated with a particular encryption phase. In accordance with certain embodiments, a single descriptor cannot replace both the content keys in a particular key pair. Two independent EMM messages are separately sent to populate or refresh the entire content key table 12, one identified as associated with the even encryption phase and then one identified as associated with the odd encryption phase. In other embodiments, only selected key pairs or individual keys might be provided in the EMM without limitation. The order of these messages is unimportant.

Additionally, an optional element may be employed to increase the level of indirection in transmitted data. The key index descriptor allows the key index to be transmitted separately from the program authorization table 22 and the key data tables 12. This descriptor is used to overwrite index data in the program authorization table 22 and can be used to initially provision index data separately or to re-key a system solely through transmission of new indices without transmitting key data or program authorization tables 22. The EMM carying the complete indices for a program tier would be very small compared to actual key replacement and can likely be contained in a single packet, being ⅓ the size of the authorization table and at a minimum ¼ the size of the key data table.

The CPE device should preferably never alter or modify in any way the format or contents of the data structures containing the program authorization table 22 and the key data table 12, except to apply the appropriate descriptor data from a validated EMM. The CPE device places the data received from the relevant EMM in the exact form and order into the storage structure without altering the order of entries in the table. The BAC system provides the logical channel entries in the program authorization table in a sorted fashion. Each program authorization table 22 and the key data table 12 can be transmitted in a complete form and to replace any existing table in its entirety. In other embodiments, only selected portions of each table can be transmitted.

In practice, the key data message is used to update only the future content key, which would be the keys associated with the phase opposite of the one currently being used to encrypt content. This method allows background provisioning of authorized CPEs with the content keys for the next epoch without any impact upon current device operation. That is to say for example, if the even key is currently being used, the even keys 18 can be replaced so the odd keys are undisturbed for retrieval (and vice versa).

In the illustrative embodiment, content access management is handled in the following manner with reference to FIG. 4. Channel maps are defined using a combination of two standard elements. Per the DVB architecture, all RF network resources are defined within the SI construct Network Information Table (NIT). The NIT describes the RF parameters associated with each service based upon 'NTS' criteria (Network ID, Transport ID and Service ID). The composite value for NTS is unique for every service available within the system.

The DVB structure Bouquet Association Table (BAT) provides a linkage between logical channel numbers and a specific NTS for NIT lookup and determination of the necessary RF parameters to access the QAM signal carrying a desired service. There may be multiple BATs, providing multiple channel line-ups that could represent differing channel plans based upon service tier, region, etc. Each BAT has an associated bouquet ID that uniquely identifies each BAT. All CPE are assigned an applicable bouquet ID upon provisioning via EMM that indicates the possible authorized services that could potentially be accessed by a particular CPE.

By default, all CPE can use a bouquet ID of zero when no bouquet ID has been issued by the headend. There are only two cases that this case should be encountered. The first case is when a new device is connected to the system prior to the headend sending (or the CPE receiving) provisioning. The second case is when an EMM is received from the headend with an operation mask setting indicating that the CPE should be deauthorized. The process of deauthorization is defined as deleting the bouquet ID variable along with the contents of the program authorization table.

Service access is managed through the program authorization table 22 which, as previously noted, is a logical construct maintained within the nonvolatile memory of each CPE device and its contents delivered via EMMs from the headend. This table 22 contains a list of logical channels that the particular device is permitted to access, along with the key index and other data uniquely associated with each service. The presence of a logical channel in the channel list contained within the program authorization table 22 provides an indication that the channel is a candidate for viewing on a particular CPE, but does not in itself guarantee access.

Each program authorization table 22 is transmitted via EMM to the CPE device in a complete form in the preferred embodiment to replace any existing table contents in its entirety. In this embodiment, no partial channel maps are transmitted and received table data is never appended within the CPE. In this embodiments, the EMM containing the program authorization table information will not contain the associated service and operation masks. These items are delivered by separate EMMs and are composited by the CPE onto the program authorization table 22. However, other embodiments will occur to those skilled in the art upon consideration of the present teachings.

Two other components, combined with the presence of a service's logical channel number in the program authorization table, control the ultimate determination of whether the CPE should be able to access a particular service. One component is the channel_unauthorized bit contained within the service_mask variable associated with each logical channel entry in the program authorization table 22. If this bit is set, accomplished through an EMM, then the particular channel is deauthorized and not available for viewing. The other controlling components are the CPE_deauthorized and brick_mode bits contained within the CPE operation_mask, which controls attributes for the entire CPE. It too is managed through EMM messages and is part of the program authorization table 22 structure.

Figure 4:
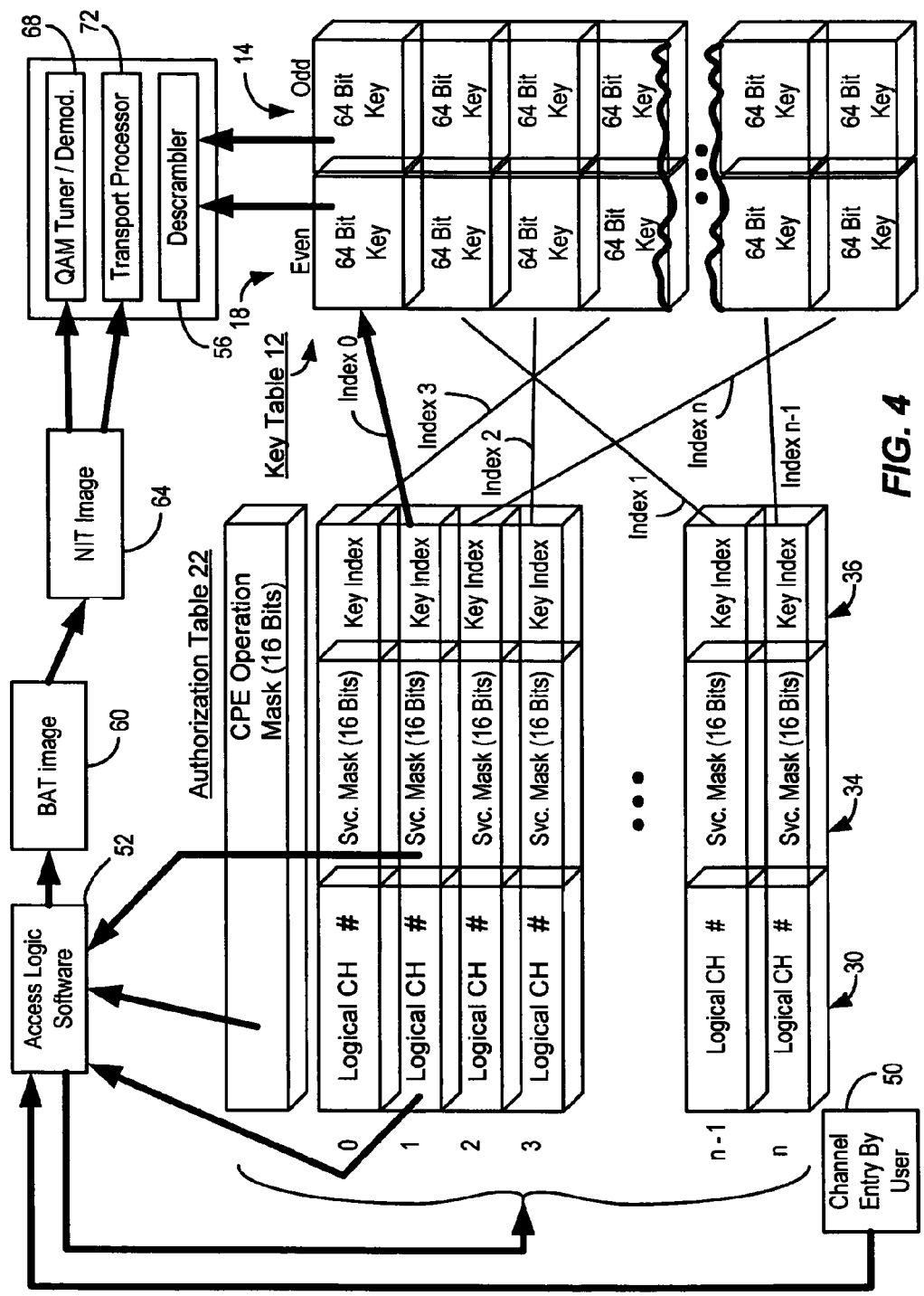
FIG. 4 illustrates a channel selection process for an encrypted channel in a manner consistent with certain embodiments of the present invention.
Figure 5:
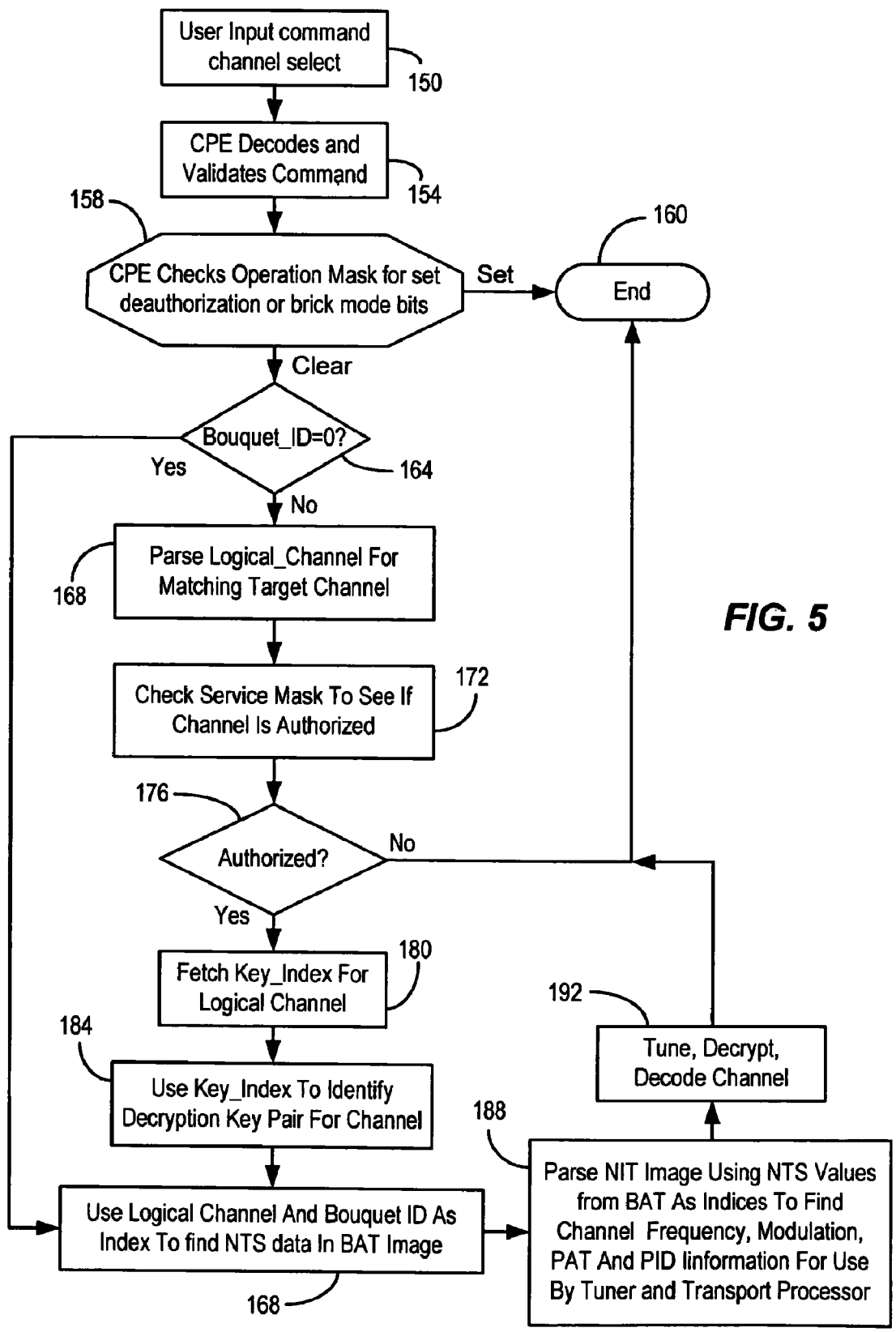
FIG. 5 is a flow chart of an exemplary process consistent with certain embodiments of the present invention.

The process of accessing a particular service is illustrated in FIG. 4 and FIG. 5 and follows the subsequent logic (referencing identifiers for both figures):

A viewer indicates the desire to change decoded A/V service through their remote control or other user interface at 50 and 150. For example, this can be accomplished by a channel up/down command or a direct logical channel number entry.

1. A computer program application (Access Logic Software 52) running on the CPE receives, decodes and validates the user command at 154.

2. At 158, the CPE application checks the value of the operation_mask 26 contained within the program authorization table 22 to see if either the CPE_deauthorized or brick_mode bits are set. If the either of these bits are set, further processing of the request is ended at 160. If the bouquet_id is set to zero (default) at 164, then the process continues to 168 without further reference to the program authorization table 22 for access to free or barker channels in an unprovisioned CPE and goes directly to item 6 below. Otherwise, the process proceeds to 3 below.

3. The CPE application parses the logical_channel field of the program authorization table at 168 using the following index:

a. For channel up/down, use current channel number as the search index. When the match is found, increment or decrement one entry as appropriate to reach the entry for the target channel.

b. For direct entry, use the entered logical channel value as an index for the target channel. If the desired target channel is not contained within the table, display and appropriate OSD informing viewer.

4. From the program authorization table 22, the CPE Access Logic Software application 52 obtains the service mask field associated with the logical channel entry in the program authorization table 22 at 172 and checks to see if the channel_unauthorized bit is set at 176. If this bit is set at 176, then further processing of the request is ended at 160. The CPE Access Logic Software application also obtains the key_index value at 180 associated with the requested service from the same record in the program authorization table containing the target logical_channel value.

5. Using the key_index value associated with the requested service, the CPE Access Logic Software application 52 accesses the key table 12 stored in nonvolatile memory at 184, using the key_index value as the array index to obtain the two 64-BIT DVB-CSA working keys used to encrypt the content. (In the example shown in FIG. 4, the key index points to keys indexed at the 0 position.) The key pair values are loaded by the CPE Access Logic Software application in the CPE transport decryption subsystem (descrambler 56) for content decryption.

6. The CPE Access Logic Software application 52 parses the BAT image 60 at 168 stored in RAM, using the logical_channel and bouquet_id values as paired indices. When the entry in the table matching both criteria is found, the associated network_id, transport_id and service_id values (referred to collectively as 'NTS') are obtained from the cached bouquet allocation table (BAT).

7. The CPE Access Logic Software application 52 next (at 188) parses the NIT image 64 stored in RAM, using the NTS values obtained from the BAT as composite indices. When the entry in the table matching all criteria is found, the associated frequency, modulation and PAT PID information are obtained from the table. The data obtained are then used by the CPE Access Logic Software application to provision the tuner and demodulator 68 and transport processor 72 subsystems to access the transport containing the requested service.

The CPE executes the tuning process and then follows the standard MPEG procedure using the service_id of the requested service and the transport PSI data tree to determine and use the respective audio and video resources of the transport multiplex to decode the desired service at 192.

The EMM format supports both unit (singular) and group messages and both the definition of and membership within a group can be arbitrarily defined. The CPE devices under BAC management are able to belong to multiple groups and each device by default belongs to two groups: itself (unit) and a global group encompassing all devices. The EMM is structured as a standard MPEG private section, containing one or more descriptors. The descriptors provide specific direction to the CPE regarding channel authorization, key delivery, software download commands, group membership, emergency alerts, etc. Regardless of number or type of descriptors contained within the EMM, each message is both encrypted using a global, fixed key and validated through a cryptographic signature.

Every known cryptographic system for cable and satellite systems has a root secret stored somewhere inside the CPE client. In traditional CA systems, this is done with either smart cards, dedicated custom ICs or through other means to create an electrically and mechanically secure environment to store the root secrets. The basic access control system does not use these extremely complex schemes nor incurs the associated hardware and licensing costs. The system contains four root secrets that are stored within the CPE. In order to compromise the system, all four must be known. The root secrets are the respective key pairs for the EMM and software download transport encryption and the keys for both the software download and EMM HMAC algorithms, respectively.

In one embodiment, the basic access control (BAC) schema uses at least one key pair per service tier. Service tiers are groups of individual logical channels associated with services that are bundled as a discrete entity ("package"). This methodology is extensible to support service tiers of any size, including single programs, such as individual events. Access to a particular service tier is determined by whether a supported CPE device has possession of the appropriate service tier key(s). To maintain message security, all EMMs are signed by the service provider's private key so that the received message may be authenticated by the CPE device.

In addition, entitlement (authorization) to individual services is determined through a service_mask, matched to each service with an authorization bit carried in the mask in an "opt-out" fashion. If a particular service bit is one in table 22, the content represented by the bit is non-authorized. The service_mask is maintained in nonvolatile memory in authorization table 22 within each supported CPE device and is locally modified through data carried in authenticated EMMs to reflect the services that a particular CPE device is intended to access. This arrangement, while reinforcing the key-per-tier schema, also allows implementation of á la carte programming. This schema also allows for the removal of programming upon a subscriber's request that they may want eliminated.

In accordance with certain embodiments, three types of keys are defined and employed: emm_key, download_key and content_key. In one particular embodiment, the emm_key is a pair of 64-bit values that are fixed and used to decrypt all DVB-CSA encrypted EMM messages received by the CPE, though any appropriate key length and encryption algorithm may be employed. This key has the same value for all CPE devices. These emm_key values are permanently stored in the CPE in a secure manner. In one example embodiment, the download_key is a pair of 64-bit values that are also fixed and are used to decrypt all DVB-CSA encrypted SBS-download content messages received by the CPE, though any appropriate key length and encryption algorithm may be employed. The same values are used for all CPE devices. These values are also permanently stored in the CPE in a secure manner. The content keys are the keys used for decryption of the encrypted content. Content keys are stored in the CPE in nonvolatile memory in a secure manner. The content keys are organized as an array, as shown previously in FIG. 1 for certain embodiments.

In accordance with certain embodiments, the content keys may be fixed in memory at the time of provisioning or manufacture. In other embodiments, as described above, the keys may be dynamically delivered at any suitable interval. Since there are many keys available for decryption, replacing the keys does not have to be done as often as in conventional cable systems. Likewise, the authorization table 22 containing the logical_channel, key_index and service_mask values can either be provided as a hardcoded table of constants or can be dynamically changed by use of transmission of channel authorization descriptors had in an EMM.

Hence, in certain embodiments, the content key can be changed on a regular basis by simply transmitting EMM messages containing new index value associations between the logical channel and the content decryption key pair. Electronic signatures can be employed to authenticate entitlement messages and software download messages. Each device can be addressed globally, individually or by group or service tier. Additionally, it is noted that there may be any number m+1 of content key pairs stored in table 12. The association between logical channels and content keys need not be 1:1. For example, multiple channels may be associated with a single key, and certain keys may not be associated with any channels at all at any given time. By providing an abundant library of keys, the decryption of content can be altered by changing the key index associated with a particular logical channel. This can be accomplished at any time for a single channel, multiple channels or all channels.

In accordance with certain embodiments, EMMs can be delivered through at least two independent mechanisms. The first delivery method, which is particularly useful for two-way devices, is through the use of the DOCSIS compliant cable modem integral to two-way CPE devices (e.g., set-top boxes). A second delivery method that can be provided for one-way devices and as an alternate method for two-way devices is in-band delivery, duplicated on each transport stream. The in-band delivery can for example closely follow the MPEG prescribed method.

A conditional access table (CAT), as defined in ISO/IEC 13818-1, can be carried in each transport stream and transmitted with the system SI data via DOCSIS delivery using UDP multicast. The CAT can contain one or more CA descriptors, as required by the standard. One of the CA descriptors can have the CASID of the system and the table also provides the EMM PID assignment within a particular transport stream. In this case, the CPE configures its transport processing elements to receive EMMs carried on this PID. For devices that receive SI through OOB methods such as DOCSIS, the EMM data can be carried on a multicast IP address and port specified in the CAT message, but the rest of the process and syntax remains unchanged from the in-band process.

The EMM can use, for example, the following format:
table_id: An 8-bit field that is set to 0x82 to identify this private table uniquely as a unit addressed EMM or to 0x84 to identify this private table uniquely as a group addressed EMM.
section_syntax_indicator: A 1-bit field that is set to 0 to identify this table as a private section. The following bit set to zero signifies the data payload as private data.
address_hash: A 16-bit field carrying the hashed value of either the unit or group address, depending upon the table_id value. The entire 48-bit address field shall be condensed into a single 16-bit value using the 32-bit FNV-1 hash with xor-folding. This parameter is provided as a method to allow hardware filtering of EMMs and reduce CPE processor workload.
version: a 5 bit field that is monotonically increased for each unique EMM transmitted to a particular addressee or group, as applicable.
address: A 48-bit field carrying either the unit or group address, depending upon the table_id value. This is the same value used to create the address_hash.

The EMM message carries one or more MPEG format descriptors, which contain the actual entitlement payload. Every EMM has at least a signature data descriptor, which is always the last descriptor in an EMM. The inclusion of any descriptors in addition to the signature data descriptor is optional and there is no limitations regarding the number or order of the optional descriptors.

The EMM section is marked as an MPEG private section containing private data. For MPEG, each EMM section cannot exceed 4096 bytes in length. If the total message payload exceeds 4096 bytes, then multiple sections are transmitted and the payload spans sections, with the section_number and last_section_number indicating where a particular section fits in the sequence. In a multi-section EMM, each section is not terminated with a 4 byte CRC for that particular section. The last section in the message contains a CRC covering the composite payload. It is the responsibility of the receiving device to buffer a multi-section EMM in the correct sequential order and to remove the intervening section headers before EMM payload concatenation and composite CRC validation.

In accordance with certain embodiments, each CPE will initially be provisioned for services through reception of an EMM carrying at a minimum a group address assignment and FIPS assignment descriptor. The STB will receive an assignment to a group address carrying the "super group" address applicable to that CPE. The EMM carried in the "super group" typically carries only version and signature descriptors. The version descriptor includes other group addresses pointing to the key list and program authorization tables appropriate to that CPE based upon service tier, CPE type, region and/or locality.

The key data descriptor is a private descriptor providing the array of working keys used for decrypting content. Its format is defined for the illustrative embodiment in TABLE 2 below.

TABLE 2

| Syntax | No. of Bits | Identifier |
|---|---|---|
| key_data_descriptor( ){ | | |
| descriptor_tag | 8 | uimsbf |
| descriptor_length | 32 | uimsbf |
| key_phase | 1 | bslbf |
| reserved | 7 | bslbf |
| key_count | 16 | uimsbf |
| for (i=0; i<key_count;i++) | | |
| { | 64 | uimsbf |
| content_key | | |
| } | | |
| } | | |

This table uses the following variables:

descriptor_tag: An 8-bit field that is set to 0xB2 to identify this descriptor uniquely as a key data descriptor.

descriptor_length: A 32-bit field specifying the number of bytes immediately following the descriptor_length field, up to the end of this descriptor.

key_phase: A single bit field that when set to a '1', indicates that the following array data is applied to packets carrying a transport scrambling_control_value of '11'. If the bit is cleared to a '0', it indicates that the following array data is applied to packets carrying a transport_scrambling_control value of '12'.

key_count: A 16-bit field containing the number of entries in the content key array content_key: A 64-bit value containing one DVB-CSA content key.

The signature data descriptor is a private descriptor providing the signature payload used for authentication of an EMM message. Its format is defined in TABLE 3 below.

TABLE 3

| Syntax | No. of Bits | Identifier |
|---|---|---|
| signature_data_descriptor( ){ | | |
| descriptor_tag | 8 | uimsbf |
| descriptor_length | 32 | uimsbf |
| EMM_signature | 160 | uimsbf |
| } | | |

In TABLE 3, the following variables are used:

descriptor_tag: An 8-bit field that is set to 0xB3 to identify this descriptor uniquely as a signature data descriptor.

descriptor_length: A 32-bit field specifying the number of bytes immediately following the descriptor_length field, up to the end of this descriptor. For this particular descriptor, the value is defined to be 0x14.

EMM_signature A 160-bit field carrying the EMM message authentication code.

The program authorization descriptor is a private descriptor carrying the information used to provision the CPE to receive program content tiers. Its format for the example embodiment is defined in TABLE 4 below.

TABLE 4

| Syntax | No. of Bits | Identifier |
|---|---|---|
| program_authorization_descriptor( ){ | | |
| descriptor_tag | 8 | uimsbf |
| descriptor_length | 32 | uimsbf |
| bouquet_id | 16 | uimsbf |
| reserved | 16 | uimsbf |
| channel_count | 16 | uimsbf |
| for (i=0; i<channel_count;i++) { | | |
| logical_channel | 16 | uimsbf |
| reserved | 16 | uimsbf |
| key_index | 16 | uimsbf |
| } | | |
| } | | |

TABLE 4 uses the following variables:

descriptor_tag: An 8-bit field that is set to 0xB5 to identify this descriptor uniquely as a program authorization descriptor.

descriptor_length: A 32-bit field specifying the number of bytes immediately following the descriptor_length field, up to the end of this descriptor.

bouquet_id: A 16-bit field carrying the index to the assigned channel bouquet as defined in the BAT table.

channel_count: A 16-bit field indicating the size of the channel array following this variable.

logical_channel: A 16-bit field specifying a logical channel number. The logical channel identified in this field is paired to the service_mask, carried in the service_mask descriptor, field as a record pair.

The data contained within array is stored in CPE nonvolatile memory. In the case where the array has not been received or is an entry for a particular channel otherwise missing, the default value is set to, for example, 0x00.

key_index: A 16-bit field specifying a pointer to an element in the data structure, stored in CPE nonvolatile memory containing the content keys for the service. Both the audio and video portions of a given service use the same content encryption key in this embodiment, but this should not be considered limiting.

The service mask descriptor is a private descriptor carrying the information used to change the attributes associated with the services provisioned in a CPE and stored in nonvolatile memory as part of the program authorization table structure. It is a subset of the program authorization descriptor. Its format, for the example embodiment is defined in TABLE 5 below.

TABLE 5

| Syntax | No. of Bits | Identifier |
|---|---|---|
| service_mask_descriptor( ){ | | |
| descriptor_tag | 8 | uimsbf |
| descriptor_length | 32 | uimsbf |
| item_count | 16 | uimsbf |
| for (i=0; i<item_count;i++) | | |
| { | 16 | uimsbf |
| logical_channel | 16 | uimsbf |
| service_mask | | |
| } | | |
| } | | |

TABLE 5 uses the following variables:

descriptor_tag: An 8-bit field that is set to 0xBB to identify this descriptor uniquely as a service mask descriptor.

descriptor_length: A 32-bit field specifying the number of bytes immediately following the descriptor_length field, up to the end of this descriptor.

item_count: A 16-bit field indicating the number of entries in the list following this variable.

logical_channel: A 16-bit field specifying a logical channel number. The logical channel identified in this field will be paired to the subsequent service_mask field as a record pair service_mask: A 16-bit field containing a binary mask indicating attributes associated with the corresponding logical channel. Service Mask Bits are defined in accordance with TABLE 6 below.

TABLE 6

| Position | Mask Bit Definition (Set) |
|---|---|
| 0x0000 | Clears all previous mask bits |
| 0x0001 | Channel Unauthorized |
| 0x0002 | Macrovision Activated |
| 0xFFFC to 0x0004 | Reserved |

The data contained within this array is stored in CPE nonvolatile memory. In the case where the array has not been received or is an entry for a particular channel otherwise missing, the default value can be set to 0x00.

The BAT descriptor is a private descriptor carrying the information necessary to provision the CPE to receive program content tiers by changing the value of the bouquet_id variable stored within the CPE nonvolatile memory as part of the program authorization table structure. It is a subset of the program authorization descriptor. Its format is defined in TABLE 7 below.

TABLE 7

| Syntax | No. of Bits | Identifier |
|---|---|---|
| bouquet_descriptor( ){ | | |
| descriptor_tag | 8 | uimsbf |
| descriptor_length | 32 | uimsbf |
| bouquet_id | 16 | uimsbf |
| } | | |

TABLE 7 uses the following variables:

descriptor_tag: An 8-bit field that can be set to 0xBC to identify this descriptor uniquely as a bouquet descriptor.

descriptor_length: A 32-bit field specifying the number of bytes immediately following the descriptor_length field, up to the end of this descriptor.

bouquet_id: A 16-bit field carrying the index to the assigned channel bouquet as defined in the BAT table.

Thus, a receiver device consistent with certain embodiments that receives and decrypts digital cable or satellite television signals has a receiver that tunes and demodulates the television signal into a digital transport stream. A decrypter decrypts the digital transport stream using a pair of decryption keys. A first decryption key array stored in a first storage location forming a part of the receiver device, and a second key array stored in a second storage location forming a part of the receiver device, the first and second key arrays representing ordered pairs of keys. An authorization table is stored in a third storage location forming a part of the receiver device, the authorization table containing a mapping, wherein each ordered pair of decryption keys corresponds to a different one of a plurality of Multichannel Video Program Distributors (MVPD). Any of the first, second and third storage locations may or may not be a part of a single memory device.

Another receiver device that receives and decrypts digital cable or satellite television signals has a receiver that tunes and demodulates the television signal into a digital transport stream. A decrypter decrypts the digital transport stream using a pair of decryption keys comprising an even key and an odd key, wherein the even and odd keys are alternately used by the decrypter for decryption during successive key epochs. A key table is stored in a first secure persistent storage medium forming a part of the receiver device, the key table containing a library of a plurality of even keys and an associated plurality of odd keys forming key pairs that are indexed with a key identifier. An authorization table is stored in a second secure persistent storage medium forming a part of the receiver device, the authorization table containing a mapping of a logical channel to a key pair identifier for each of a plurality of logical channels. At least a portion of contents of the authorization table is received in a first encrypted private Entitlement Management Message (EMM) message in order to establish the mapping of a logical channel to a key pair identifier. In response to a user input for selecting one of the plurality of logical channels in the authorization table a key index associated with the selected logical channel is identified, and the key index is used to select a key pair from the key table for use by the decrypter in decrypting the transport stream.

A method, consistent with certain embodiments, of enabling a receiver device to decrypt digital satellite or television signals involves storing a plurality of key pairs in a key table in secure persistent storage in the receiver device, with each key pair corresponding to a key index; receiving a first private Entitlement Management Message (EMM) at the receiver device containing a mapping of at least one logical channel to a key index identifying a key pair associated used for decrypting the logical channel; storing the mapping in an authorization table along with information indicating whether or not the receiver device is authorized to receive the logical channel; receiving a command to tune to a specified logical channel; referencing the authorization table to determine if the receiver device is authorized to tune to the tuning the receiver device to the specified logical channel; if the receiver device is authorized to tune to the specified logical channel, tuning to the specified channel and demodulating a digital transport stream; referencing the authorization table to retrieve the key pair mapped to the logical channel; and decrypting the transport stream using the key pair, with one key of the key pair being used at a time.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A receiver device that receives and decrypts digital television signals, comprising:
    a receiver that tunes and demodulates the television signal into a digital transport stream;
    a decrypter that decrypts the digital transport stream using a pair of decryption keys comprising an even key and an odd key, wherein the even and odd keys are alternately used by the decrypter for decryption during successive key epochs;
    a key table stored in a first secure persistent storage medium forming a part of the receiver device, the key table containing a library of a plurality of even keys and an associated plurality of odd keys forming key pairs that are indexed with a key identifier, wherein the library of key pairs can be accessed by an index to select a particular key pair from the library;
    where the index comprises a memory address;
    an authorization table stored in a second secure persistent storage medium forming a part of the receiver device, the authorization table containing a mapping in the form of a key index of a logical channel to a key pair identifier for each of a plurality of logical channels and further containing a service mask entry for each logical channel that determines authorization to access each logical channel and operational attributes associated with the logical channel and further containing a CPE operation mask that stores control attributes for the receiver device;
    where the mapping maps a each logical channel to a key index, and where there are more key indices than logical channels;
    at least one bouquet association table (BAT) having a unique identifier stored in the receiver device, that stores an association between a collection of logical channels and a service tier authorized for the receiver device;
    wherein, at least a portion of contents of the authorization table is received in a first encrypted private Entitlement Management Message (EMM) message in order to establish or change the mapping of a logical channel to a key pair identifier without need to change the library of key pairs, where the encrypted private EMM is devoid of any key associated with any logical channel in the library of key pairs but instead provides the key index associated with a logical channel so that the key index can be used to access a selected key from the library of key pairs; and
    means responsive to a user input for selecting one of the plurality of logical channels in the authorization table to identify a key index associated with the selected logical channel, and for further using the key index to select a key pair from the key table for use by the decrypter in decrypting the transport stream.

2. The receiver device according to claim 1, further comprising a DOCSIS modem forming a part of the receiver device, and wherein the first EMM is received by the receiver device over the DOCSIS modem via an out of band channel.

3. The receiver device according to claim 1, wherein the first EMM is received by the receiver device using an inband channel.

4. The receiver device according to claim 1, wherein at least a portion of the contents of the key table is received in a second encrypted private (EMM) message.

5. The receiver device according to claim 4, further comprising a DOCSIS modem forming a part of the receiver device, and wherein the second EMM is received by the receiver device over the DOCSIS modem via an out of band channel.

6. The receiver device according to claim 4, wherein the second EMM is received by the receiver device using an inband channel.

7. The receiver device according to claim 1, wherein the encrypted private EMM message updates the key table and contains a collection of either odd keys or even keys only, whereby, no single EMM message for updating the key table contains both odd keys and even keys.

8. The receiver device according to claim 1, wherein at least a portion of the library of keys in the key table is replaced by receipt of a pair of encrypted private EMM message, with one containing replacement odd keys the other containing replacement even keys.

9. The receiver device according to claim 1, wherein a new set of odd keys is only stored in the key table during a time when an odd key is currently in use by the decrypter, and wherein a new set of even keys is only stored in the key table during a time when an even key is currently in use by the decrypter.

10. The receiver device according to claim 1, wherein the key table entries are initially populated during a provisioning process.

11. The receiver device according to claim 1, wherein the key table entries are initially populated at a time of manufacture.

12. The receiver device according to claim 1, wherein the authorization table further comprises an operation mask that determines whether or not the receiver device is authorized to operate on a specified network.

13. The receiver device according to claim 1, wherein the first secure persistent storage medium and the second secure persistent storage medium comprise separate portions of a single storage device.

14. The receiver device according to claim 1, wherein the first and second secure persistent storage medium are mechanically secured within the receiver device such that the key table and the authorization table are inaccessible in unencrypted form.

15. The receiver device according to claim 1, wherein the key table contains at least about 8,000,000 unique key pairs.

16. A receiver device that receives and decrypts digital television signals, comprising:
    a receiver that tunes and demodulates the television signal into a digital transport stream;
    a decrypter that decrypts the digital transport stream using a pair of decryption keys;
    a first decryption key array stored in a first storage location forming a part of the receiver device;
    a second key array stored in a second storage location forming a part of the receiver device, the first and second key arrays representing ordered pairs of keys such that the first and second key arrays provide library of key pairs that can be accessed by an index to a selected key pair;

where the index comprises a memory address;

an authorization table stored in a third storage location forming a part of the receiver device, the authorization table containing a mapping in the form of a key index, wherein each ordered pair of decryption keys corresponds to a different one of a plurality of Multichannel Video Program Distributors (MVPD), the authorization table further containing a service mask entry for each logical channel that determines authorization to access each logical channel and operational attributes associated with the logical channel and the authorization table further containing a CPE operation mask that stores control attributes for the receiver device;

where the mapping maps a each logical channel to a key index, and where there are more key indices than logical channels;

at least one bouquet association table (BAT) having a unique identifier stored in the receiver device, that stores an association between a collection of logical channels and a service tier authorized for the receiver device; and wherein, at least a portion of contents of the authorization table is received in a first encrypted private Entitlement Management Message (EMM) message in order to establish or change the mapping of the ordered pair of decryption keys to the MVPD without need to change the library of key pairs, where the encrypted private EMM is devoid of any key associated with any MVPD in the library of key pairs but instead provides the key index associated with a MVPD so that the key index can be used to access a selected key from the library of key pairs.

17. The receiver device according to claim 16, wherein the authorization table is received in a first encrypted private Entitlement Management Message (EMM) message in order to establish the mapping.

18. The receiver device according to claim 16, further comprising means responsive to a user input for selecting one of the plurality MVPDs to identify an ordered pair of decryption keys using the mapping in the authorization table.

19. The receiver device according to claim 16, wherein the authorization table further comprises a service mask entry for each MVPD that determines the receiver device's authorization to receive content from each MVPD.

20. The receiver device according to claim 16, wherein the authorization table further comprises an operation mask that determines whether or not the receiver device is authorized to operate on a specified network.

21. The receiver device according to claim 16, wherein the authorization table contains global attributes of the receiver device.

22. The receiver device according to claim 16, wherein the service mask authorization table contains a service attribute for at least one channel.

23. A receiver device that receives and decrypts digital television signals, comprising:

a receiver that tunes and demodulates the television signal into a digital transport stream;

a decrypter that decrypts the digital transport stream using a pair of decryption keys comprising an even key and an odd key, wherein the even and odd keys are alternately used by the decrypter for decryption during successive key epochs;

a key table stored in a first secure persistent storage medium forming a part of the receiver device, the key table containing a library of a plurality of even keys and an associated plurality of odd keys forming key pairs that are indexed with a key identifier, wherein the library of key pairs can be accessed by an index to select a particular key pair and wherein the key table entries are initially populated during a provisioning process;

where the index comprises a memory address;

wherein at least a portion of the library of keys in the key table is replaced by receipt of a first encrypted private EMM message that contains replacement odd keys and receipt of a second encrypted private EMM message that contains replacement even keys, and wherein a new set of odd keys is only stored in the key table during a time when an odd key is currently in use by the decrypter, and wherein a new set of even keys is only stored in the key table during a time when an even key is currently in use by the decrypter;

an authorization table stored in a second secure persistent storage medium forming a part of the receiver device, the authorization table containing a mapping in the form of a key index of a logical channel to a key pair identifier for each of a plurality of logical channels;

where the mapping maps a each logical channel to a key index, and where there are more key indices than logical channels;

wherein the authorization table further comprises a service mask entry for each logical channel that determines the receiver device's authorization to receive each logical channel, and wherein the authorization table further comprises an operation mask that determines whether or not the receiver device is authorized to operate on a specified network and wherein the service mask entry for each logical channel determines operational attributes associated with the logical channel and wherein the service mask further contains a CPE operation mask that stores control attributes for the receiver device;

at least one bouquet association table (BAT) having a unique identifier stored in the receiver device, that stores an association between a collection of logical channels and a service tier authorized for the receiver device;

wherein, at least a portion of contents of the authorization table is received in a third encrypted private Entitlement Management Message (EMM) message in order to establish the mapping of a logical channel to a key pair identifier without need to change the library of key pairs, where the encrypted private EMM is devoid of any key associated with any logical channel in the library of key pairs but instead provides the key index associated with a logical channel so that the key index can be used to access a selected key from the library of key pairs; and means responsive to a user input for selecting one of the plurality of logical channels in the authorization table to identify a key index associated with the selected logical channel, and for further using the key index to select a key pair from the key table for use by the decrypter in decrypting the transport stream.

24. The receiver device according to claim 23, further comprising a DOCSIS modem forming a part of the receiver device, and wherein the EMM messages are received by the receiver device over the DOCSIS modem via an out of band channel.

25. The receiver device according to claim 23, wherein the EMM messages are received by the receiver device using an inband channel.

26. The receiver device according to claim 23, wherein the first secure persistent storage medium and the second secure persistent storage medium comprise separate portions of a single storage device.

27. The receiver device according to claim 23, wherein the first and second secure persistent storage medium are mechanically secured within the receiver device such that the key table and the authorization table are inaccessible in unencrypted form.

28. The receiver device according to claim 23, wherein the key table contains at least about 8,000,000 unique key pairs.

29. A method of enabling a receiver device to decrypt digital television signals, comprising:
- storing a plurality of key pairs in a key table in secure persistent storage in the receiver device, with each key pair corresponding to a key index, where the key table forms a library of key pairs that can be accessed by the key index to select a particular key pair;
- where the key index comprises a memory address;
- receiving a first private Entitlement Management Message (EMM) at the receiver device containing a mapping of one logical channel mapped in a mapping to a key index identifying a key pair used for decrypting the logical channel in order to establish or change the mapping of a logical channel to a key pair identifier without need to change the library of key pairs, where the encrypted private EMM is devoid of any key associated with any logical channel in the library of key pairs, but instead provides the key index associated with a logical channel so that the key index can be used to access a selected key from the library of key pairs;
- where the mapping maps a each logical channel to a key index, and where there are more key indices than logical channels;
- storing the mapping in an authorization table along with a key index and a service mask entry for each logical channel that determines authorization to access each logical channel and operational attributes associated with the logical channel and further storing a CPE operation mask of control attributes for the receiver device;
- storing at least one bouquet association table (BAT) having a unique identifier stored in the receiver device, that stores an association between a collection of logical channels and a service tier authorized for the receiver device;
- receiving a command to tune to a specified logical channel;
- referencing the authorization table to determine if the receiver device is authorized to tune to the specified logical channel;
- if the receiver device is authorized to tune to the specified logical channel, tuning to the specified channel and demodulating a digital transport stream;
- referencing the authorization table to retrieve an index value that maps a key pair to the logical channel; and
- decrypting the transport stream using the key pair, with one key of the key pair being used at a time.

30. The method according to claim 29, wherein the receiver device comprises a DOCSIS modem, and wherein the first EMM is received by the receiver device over the DOCSIS modem via an out of band channel.

31. The method according to claim 29, wherein the first EMM is received by the receiver device using an inband channel.

32. The method according to claim 29, wherein at least a portion of the contents of the key table is received in a second encrypted private (EMM) message.

33. The method according to claim 32, wherein the receiver device further comprises a DOCSIS modem, and wherein the second EMM is received by the receiver device over the DOCSIS modem via an out of band channel.

34. The method according to claim 32, wherein the second EMM is received by the receiver device using an inband channel.

35. The method according to claim 32, wherein the second encrypted private EMM message updates the key table and contains a collection of either odd keys or even keys only, whereby, no single EMM message for updating the key table contains both odd keys and even keys.

36. The method according to claim 32, wherein at least a portion of the keys in the key table is replaced by receipt of a pair of encrypted private EMM message, with one containing replacement odd keys the other containing replacement even keys.

37. The method according to claim 29, wherein a new set of odd keys is only stored in the key table during a time when an odd key is currently in use by the decrypter, and wherein a new set of even keys is only stored in the key table during a time when an even key is currently in use by the decrypter.

38. The method according to claim 29, wherein the authorization table further comprises an operation mask that determines whether or not the receiver device is authorized to operate on a specified network.

39. A non-transitory computer readable storage medium storing instructions which, when executed on a programmed processor, carry out a process according to claim 29.

* * * * *